United States Patent Office 3,293,245
Patented Dec. 20, 1966

3,293,245
2-FLUOROALKYL OXAZOLINES AND OXAZINES
Morton H. Litt, Taghi G. Bassiri, and Alan J. Levy, Morristown, N.J., assignors to Allied Chemical Corporation, New York, N.Y., a corporation of New York
No Drawing. Filed July 13, 1964, Ser. No. 382,350
5 Claims. (Cl. 260—244)

This invention relates to the preparation of 2-fluoroalkyl substituted cyclic iminoethers. More particularly this invention relates to the preparation of 2-fluoroalkyl oxazolines and oxazines by the reaction of N-(ω-chloroalkyl)-fluoroamides with a base.

In the past attempts have been made to prepare 2-substituted oxazolines by heating N-(β-hydroxyethyl)-amides to effect cyclodehydration by thermal decomposition. This prior art procedure resulted in low yields of 2-lower alkyl substituted-2-oxazolines such as 2-methyl-2-oxazoline and 2-ethyl-2-oxazoline, but efforts to obtain 2-phenyl-2-oxazoline by this method were unsuccessful. In order to obtain 2-phenyl-2-oxazoline it was found necessary to add condensing agents such as phosphorus pentoxide to the system, and even then the yields obtained were low.

Our copending U.S. application Serial No. 382,342, filed concurrently herewith, discloses a process for the preparation of 2-substituted oxazolines and oxazines by the vapor phase cyclodehydration of N-(ω-hydroxyalkyl)-amides in the presence of a catalyst.

Another copending United States application Serial No. 382,343, filed concurrently herewith discloses the preparation of carbon-nitrogen backbone chain polymers from 2-substituted cyclic iminoethers such as 2-substituted-2-oxazolines and 2-substituted-5,6-dihydro-1,3,4-oxazines. As part of this work it was desired to prepare polymers from novel derivatives of the above starting materials in which the 2-substituents were fluoroalkyl radicals terminated by a trifluoromethyl group. It was thus necessary to devise a method of preparing these novel fluoroalkyl-substituted heterocyclic monomers. Further, in order to make the polymers economically feasible, the process for preparing the monomers had to give relatively high yields.

It is therefore an object of the present invention to provide a process for the preparation of 2-fluoroalkyl substituted cyclic iminoethers.

It is another object of the present invention to provide a process wherein high yields of 2-substituted iminoethers are obtained by the treatment of an N-(ω-chloroalkyl)-fluoroamide with a base.

It is still another object of the present invention to provide a process wherein both 2-fluoroalkyl-2-oxazolines and 2-fluoroalkyl-5,6-dihydro-1,3,4-oxazines are produced.

It is still a further object of the present invention to provide novel 2-fluoroalkyl-2-oxazolines and 2-fluoroalkyl-5,6-dihydro-1,3,4-oxazines.

Additional objects and advantages of this invention will become apparent from the following detailed description and will flow therefrom.

In accordance with the present invention N-(ω-chloroalkyl)-fluoroamides of the formula:

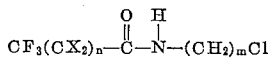

wherein $n$ is an integer from 0 to 15, $m$ is an integer from 2 to 3 and X at each occurrence is a member independently selected from the group consisting of fluorine, chlorine and hydrogen, are converted to 2-substituted cyclic iminoethers of the formula:

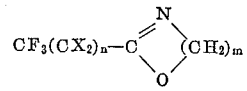

wherein $n$, $m$ and X have the above meanings, by treatment with a base. Using this procedure 2-substituted-2-oxazolines and 2-substituted-5,6-dihydro-1,3,4-oxazines are obtained in high yields.

The N-(ω-chloroalkyl)-fluoroamides suitable for use in this invention and the preparation thereof are described in our copending U.S. application Serial No. 382,263, filed concurrently herewith.

The bases suitable for use in this invention are preferably sodium hydroxide, potassium hydroxide and lithium hydroxide, although calcium hydroxide, barium hydroxide and pyridine may be used. Preferably at least one equivalent of base is used per mol of amide. Excellent results are obtained using between about 1 and 2 equivalents of base for each mol of amide. Still larger proportions of base can be used, but large excesses of base are unnecessary.

The cyclization of the N-(ω-chloroalkyl)-fluoroamides may be carried out at temperatures between about 0° and 100° C., and preferably the temperature is in the range between about 20° and 60° C.

Additionally, the cyclization is preferably carried out in a solvent medium, for instance water and alkanols such as methanol, ethanol and propanol.

As disclosed in copending U.S. application Serial No. 382,343, filed concurrently herewith, the 2-substituted-2-oxazolines and 2-substituted -5,6-dihydro-1,3,4-oxazines prepared by the process of the present invention may be polymerized in the presence of initiators such as dimethyl sulfate and sulfuric acid. The resulting polymers may be formed into water repellent sheets and fibers, or used as water repellent coatings. In addition, some of the polymers formed are useful as water and oil repellent coatings for leather and fabric.

In addition, the compounds prepared by the process of this invention have various other utilities. For instance, they sreve as solvents since they have some unusual compatibilities and miscibilities, and for the same reason they serve as plasticizers for many kinds of resins, and with variation in the kind and size of group attached to the ring nitrogen, they can be widely adapted for any specific type of plastic and application of plastics.

The invention will be described further in conjunction with the following specific examples but it is to be understood that they are solely for the purpose of illustration and the invention is not intended to be limited solely thereto.

EXAMPLE 1

(A) Preparation of starting material 105 grams of perfluorooctanoyl chloride were dissolved in 300 cc. of ethyl ether. This solution was brought to reflux and a second solution consisting of 13 cc. of ethyleneimine dissolved in sufficient ethyl ether to give a total volume of 100 cc. was added dropwise. After all of the ethyleneimine ether solution had been added the mixture was refluxed for 10 more minutes and then cooled in a Dry Ice-acetone bath which was kept at −10° C. White crystals of N-(β-chloroethyl)-pentadecafluorooctanoamide formed which were separated out by filtration giving a 53% yield of product melting at 79° C. The structure was confirmed by infrared analysis and nuclear magnetic resonance.

(B) Cyclization 50 grams of N-(β-chloroethyl)-pentadecafluorooctanoamide prepared as above were dissolved in 100 cc. ethanol with slight heating. When all of the N-(β-chloroethyl)-pentadecafluorooctanoamide was dissolved, 25 ml. of 5 N aqueous NaOH were added. The solution was heated to 65° C. when it was observed that there were two layers, oil and water, the water layer containing NaCl. The water was decanted and the oil layer was treated with ether. The ether was removed under reduced pressure and the oil layer was distilled. 41 grams (93% yield) of 2-pentadecafluoroheptyl-2-oxazoline were recovered. This product distilled over at 40° C. at 2 mm. Hg and had a refractive index $N_D{}^{25} = 1.3267$. The structure was confirmed by infrared analysis and nuclear magnetic resonance.

Similar results are obtained when methanol or propanol is substituted for the ethanol solvent in the procedure of this example, part B; and/or when potassium hydroxide or lithium hydroxide is substituted for the sodium hydroxide in this part B procedure.

EXAMPLE 2

(A) Preparation of starting material 75.0 grams of 3-amino propanol were mixed with 300 ml. of methylene chloride. The reaction mixture was chilled in a salted ice bath and 143.9 grams of perfluorooctanoyl chloride was slowly added while never allowing the temperature of the reaction mixture to exceed 0° C. When all the acid chloride had been added the mixture was filtered yielding a solid mass. This was recrystallized from 1,2-dichloroethane to yield 100.7 grams (65% yield) of N-(γ-hydroxypropyl)-pentadecafluorooctanoamide, M.P. 62–65° C.

149.3 grams of this N-(γ-hydroxypropyl)-pentadecafluorooctanoamide were slowly added to a reaction vessel containing 46.1 ml. of thionyl chloride. When the addition was complete the solution was refluxed until the evolution of HCl ceased. This took about 3 hours. The hot solution was then poured into an evaporating dish and when the thionyl chloride had evaporated the solid was recrystallized from carbon tetrachloride. 117.8 grams (76% yield) of N-(γ-chloropropyl)-pentadecafluorooctanoamide having a melting point of 78–80° C. were obtained.

(B) Cyclization 117.6 grams of N-(γ-chloropropyl)-pentadecafluorooctanoamide, prepared as above described were dissolved in 240 ml. of methanol heating the mixture slightly to get all the amide in solution. 60 ml. of 5 N aqueous sodium hydroxide solution were added to the solution and the solution was refluxed for 30 minutes. The reaction mixture was then cooled to room temperature and poured into a separatory funnel where the lower layer containing sodium chloride was collected. About 300 ml. of water were added to the upper layer and this layer was then extracted with ether. The ether extracts were added to the lower layer which was then dried over anhydrous MgSO$_4$. After removal of the ether under reduced pressure the residual liquid was distilled to give 77.7 grams (71.5% yield) of 2-(n-pentadecafluoroheptyl)-5,6-dihydro-1,3,4-oxazine. This product is a clear liquid which has a boiling point of 70° C. at 0.6 mm. Hg and a refractive index $N_D{}^{26.3} = 1.3367$.

Similar results are obtained when ethanol or propanol is substituted in the procedure of this example, part B, for methanol; and/or when potassium hydroxide or lithium hydroxide is substituted for the sodium hydroxide in this part B procedure.

EXAMPLE 3

(A) Preparation of starting material

A solution of 52 ml. of ethyleneimine in 100 ml. of ethyl ether was added to a solution of 182 grams of perfluoropropionyl chloride in 500 ml. of ethyl ether while maintaining the reactants at a temperature of between 0°–5° C. by means of an ice bath. The reaction mixture was then allowed to come to room temperature in order to complete the reaction following which the mixture was cooled by means of a Dry Ice and acetone bath thereby precipitating N-(β-chloroethyl)-pentafluoropropionamide, C$_2$F$_5$CONHCH$_2$CH$_2$Cl. This precipitate was separated by filtration giving a 60% yield of product melting at 65° C.

(B) Cyclization

The N-(β-chloroethyl)-pentafluoropropionamide was reacted with 1.2 equivalents of 5 N aqueous NaOH at 65° C. The 2-pentafluoroethyl-2-oxazoline thus formed was separated from the water in the reaction mixture by extraction with acetone. The 2-pentafluoroethyl-2-oxazoline was then separated from the acetone by distillation giving a 60% yield of product.

We claim:
1. A fluorinated compound of the formula:

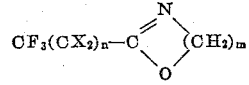

wherein $n$ is an integer of from 0 to 15, $m$ is an integer of from 2 to 3 and X at each occurrence is material independently selected from the group consisting of fluorine, chlorine and hydrogen.

2. A fluorinated compound of the formula:

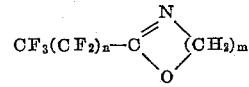

wherein $n$ is an integer of from 0 to 15 and $m$ is an integer of from 2 to 3.

3. A fluorinated compound of the formula:

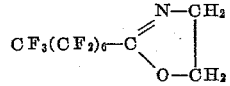

4. A fluorinated compound of the formula:

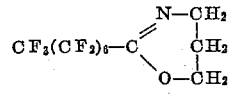

5. A fluorinated compound of the formula:

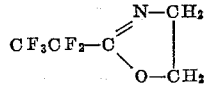

References Cited by the Examiner

Wiley: vol. 17, "The Chemistry of Heterocyclic Compounds," pp. 342–3 (Interscience) (1962).

Elderfield: "Heterocyclic Compounds," vol. 5, pp. 377–81 (Wiley) (1957).

Wiley et al.: "Chem. Rev." vol. 44, pp. 449–452 (1949).

WALTER A. MODANCE, *Primary Examiner.*

R. T. BOND, *Assistant Examiner.*